US012606059B2

(12) United States Patent
Nagata

(10) Patent No.: US 12,606,059 B2
(45) Date of Patent: Apr. 21, 2026

(54) METHODS, SYSTEMS, AND DEVICES FOR AUTOMATED INGRESS AND EGRESS FOR PASSENGERS OF A VEHICLE

(71) Applicant: Toyota Motor Engineering & Manufacturing North America, Inc., Plano, TX (US)

(72) Inventor: Katsumi Nagata, Foster City, CA (US)

(73) Assignees: TOYOTA MOTOR ENGINEERING & MANUFACTURING NORTH AMERICA, INC., Plano, TX (US); TOYOTA JIDOSHA KABUSHIKI KAISHA (JP)

( * ) Notice: Subject to any disclaimer, the term of this patent is extended or adjusted under 35 U.S.C. 154(b) by 104 days.

(21) Appl. No.: 18/639,801

(22) Filed: Apr. 18, 2024

(65) Prior Publication Data

US 2025/0326331 A1     Oct. 23, 2025

(51) Int. Cl.
| | |
|---|---|
| *B60N 2/02* | (2006.01) |
| *A61G 3/06* | (2006.01) |
| *B60J 5/10* | (2006.01) |
| *B60N 2/04* | (2006.01) |
| *B60R 22/48* | (2006.01) |

(Continued)

(52) U.S. Cl.
CPC ........... *B60N 2/0256* (2023.08); *A61G 3/062* (2013.01); *B60J 5/102* (2013.01); *B60N 2/0226* (2023.08); *B60N 2/04* (2013.01); *B60R 22/48* (2013.01); *E05F 15/40* (2015.01); *E05F 15/70* (2015.01)

(58) Field of Classification Search
CPC ...... B60N 2/0256; B60N 2/0226; B60N 2/04; A61G 3/062; B60J 5/102; B60R 22/48; E05F 15/40; E05F 15/70
See application file for complete search history.

(56) References Cited

U.S. PATENT DOCUMENTS

| | | | |
|---|---|---|---|
| 4,155,587 A | 5/1979 | Mitchell |
| 4,846,529 A | 7/1989 | Tulley |
| 5,524,952 A | 6/1996 | Czech et al. |

(Continued)

FOREIGN PATENT DOCUMENTS

| | | | |
|---|---|---|---|
| DE | 102017215903 A1 | | 3/2019 |
| JP | 2001213204 A | * | 8/2001 |
| WO | 2023054138 A1 | | 4/2023 |

OTHER PUBLICATIONS

JP 2001213204A)—english (Year: 2001).*

*Primary Examiner* — Abby Lin
*Assistant Examiner* — Renee LaRose
(74) *Attorney, Agent, or Firm* — Snell & Wilmer LLP

(57) ABSTRACT

Methods, systems, and devices for an automated ingress and egress system. The system may include a rear back door of a vehicle. The system may further include a seat and a frame coupled to the seat and a floor of the vehicle. The frame may move the seat from inside a cabin of the vehicle to outside the cabin through the rear back door. The system may further include an electronic control unit (ECU) electrically connected to the rear back door and the frame. The ECU may control the rear back door to open the rear back door, control the frame to move the seat from inside the cabin to outside the cabin through the rear back door, control the frame to move the seat from outside the cabin to inside the cabin through the rear back door, and control the rear back door to close the rear back door.

20 Claims, 9 Drawing Sheets

(51) Int. Cl.
    *E05F 15/40*        (2015.01)
    *E05F 15/70*        (2015.01)

(56)                 References Cited

U.S. PATENT DOCUMENTS

| | | | |
|---|---|---|---|
| 6,024,398 | A | 2/2000 | Horton et al. |
| 6,820,913 | B2 | 11/2004 | Macey et al. |
| 6,962,383 | B2 | 11/2005 | Takenoshita et al. |
| 6,981,746 | B2 | 1/2006 | Chung et al. |
| 7,845,703 | B2 | 12/2010 | Panzarella et al. |
| 7,850,242 | B2 | 12/2010 | Taguchi et al. |
| 7,866,723 | B2 | 1/2011 | Ninio et al. |
| 8,033,605 | B2 | 10/2011 | Miura et al. |
| 8,182,016 | B2 | 5/2012 | Kaip et al. |
| 8,398,356 | B2 | 3/2013 | Sandoz |
| 8,827,367 | B2 | 9/2014 | Hibi |
| 9,010,861 | B2 | 4/2015 | Seibold et al. |
| 9,016,797 | B2 | 4/2015 | Lida et al. |
| 10,744,976 | B1 * | 8/2020 | Wengreen ............ G06Q 20/145 |
| 2005/0218686 | A1 * | 10/2005 | Takenoshita ........... A61G 3/062 |
| | | | 296/65.11 |
| 2007/0222267 | A1 | 9/2007 | Tsujimoto et al. |
| 2023/0106562 | A1 * | 4/2023 | Bozich ................ B60W 40/105 |
| | | | 340/425.5 |
| 2024/0208370 | A1 * | 6/2024 | Herrmann .............. B60N 2/005 |

* cited by examiner

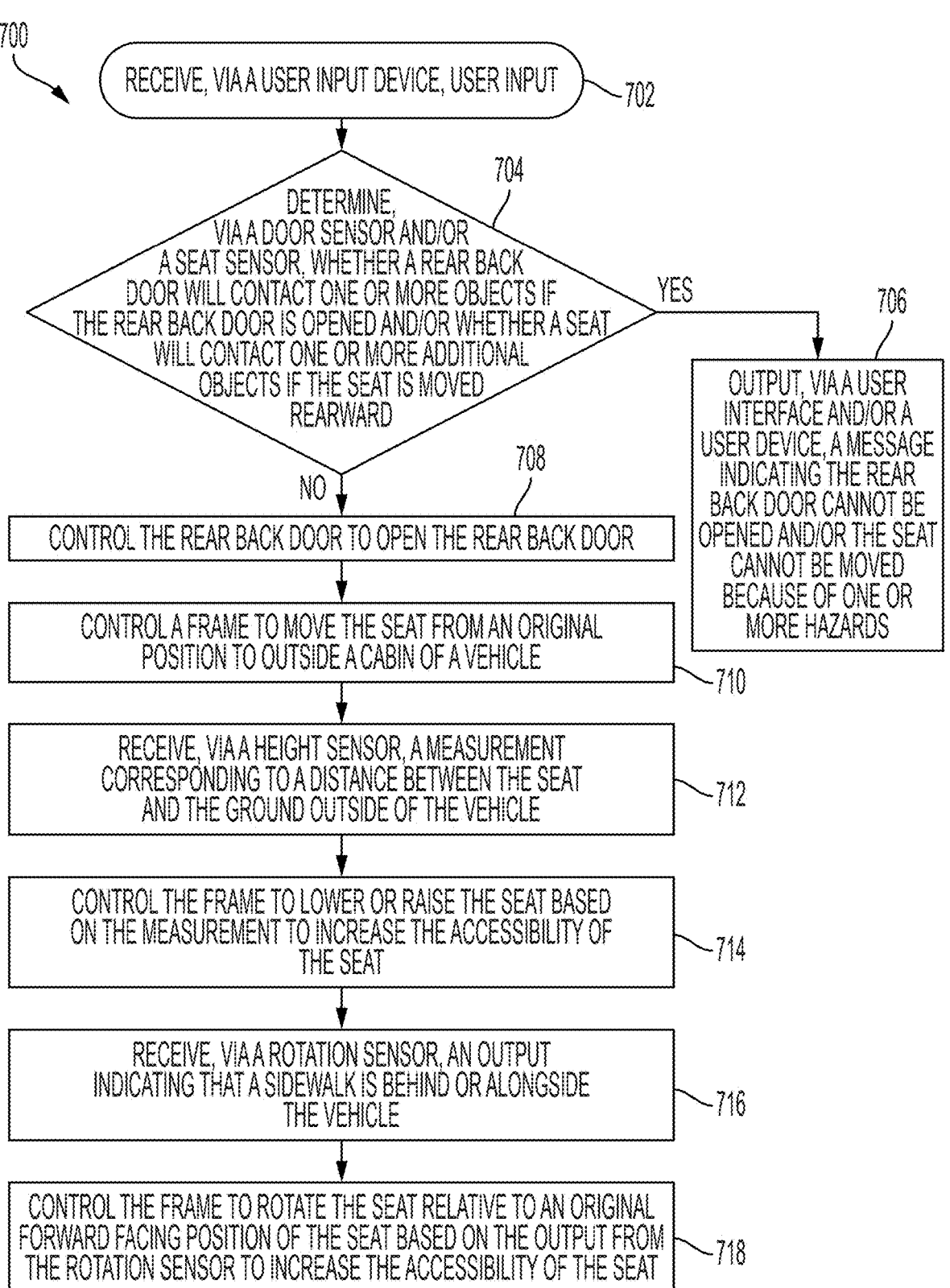

700

RECEIVE, VIA A USER INPUT DEVICE, USER INPUT — 702

DETERMINE, VIA A DOOR SENSOR AND/OR A SEAT SENSOR, WHETHER A REAR BACK DOOR WILL CONTACT ONE OR MORE OBJECTS IF THE REAR BACK DOOR IS OPENED AND/OR WHETHER A SEAT WILL CONTACT ONE OR MORE ADDITIONAL OBJECTS IF THE SEAT IS MOVED REARWARD — 704

YES

706

OUTPUT, VIA A USER INTERFACE AND/OR A USER DEVICE, A MESSAGE INDICATING THE REAR BACK DOOR CANNOT BE OPENED AND/OR THE SEAT CANNOT BE MOVED BECAUSE OF ONE OR MORE HAZARDS

NO

CONTROL THE REAR BACK DOOR TO OPEN THE REAR BACK DOOR — 708

CONTROL A FRAME TO MOVE THE SEAT FROM AN ORIGINAL POSITION TO OUTSIDE A CABIN OF A VEHICLE — 710

RECEIVE, VIA A HEIGHT SENSOR, A MEASUREMENT CORRESPONDING TO A DISTANCE BETWEEN THE SEAT AND THE GROUND OUTSIDE OF THE VEHICLE — 712

CONTROL THE FRAME TO LOWER OR RAISE THE SEAT BASED ON THE MEASUREMENT TO INCREASE THE ACCESSIBILITY OF THE SEAT — 714

RECEIVE, VIA A ROTATION SENSOR, AN OUTPUT INDICATING THAT A SIDEWALK IS BEHIND OR ALONGSIDE THE VEHICLE — 716

CONTROL THE FRAME TO ROTATE THE SEAT RELATIVE TO AN ORIGINAL FORWARD FACING POSITION OF THE SEAT BASED ON THE OUTPUT FROM THE ROTATION SENSOR TO INCREASE THE ACCESSIBILITY OF THE SEAT — 718

FIG. 7

METHODS, SYSTEMS, AND DEVICES FOR AUTOMATED INGRESS AND EGRESS FOR PASSENGERS OF A VEHICLE

BACKGROUND

1. Field

The present disclosure relates to methods, systems, and/or devices for automated ingress and egress for passengers of a vehicle.

2. Description of the Related Art

An increasing number of vehicles include three or more rows of seating. Compared to a vehicle that includes only two rows of seating, vehicles having, for example, a third row of seating can provide greater utility. However, a third row of seating in a vehicle has the cost of being less accessible to users than a second row of seating because the users generally must navigate through narrow spaces within a cabin of the vehicle to access the third row from side doors of the vehicle.

Accordingly, it is desirable to provide methods, systems, and devices for automated ingress and egress for passengers of a vehicle.

SUMMARY

In general, one aspect of the subject matter described in this disclosure may be embodied in an automated ingress and egress system for passengers of a vehicle. The automated ingress and egress system may include a rear back door of the vehicle. The rear back door may open and close. The automated ingress and egress system may further include a seat having an original position defined by the seat facing forward relative to the vehicle and being located within a cabin of the vehicle. The automated ingress and egress system may further include a frame coupled to the seat and a floor of the vehicle. The frame may move the seat from the original position to outside the cabin through the rear back door. The automated ingress and egress system may further include an electronic control unit (ECU) electrically connected to the rear back door and the frame. The ECU may control the rear back door to open the rear back door. The ECU may further control the frame to move the seat from the original position to outside the cabin through the rear back door to allow an occupant of the seat to egress from the vehicle through the rear back door. The ECU may further control the frame to move the seat from outside the cabin to the original position through the rear back door to allow another occupant of the seat to ingress to the vehicle through the rear back door. The ECU may further control the rear back door to close the rear back door.

In one aspect, the subject matter may be embodied in an automated ingress and egress system for passengers of a vehicle. The automated ingress and egress system may include a rear back door of the vehicle. The rear back door may open and close. The automated ingress and egress system may further include a third row of seats of the vehicle. The automated ingress and egress system may further include a frame coupled to at least one seat of the third row of seats and a floor of the vehicle. The frame may move the at least one seat from inside a cabin of the vehicle to outside the cabin through the rear back door. The automated ingress and egress system may further include an electronic control unit (ECU) electrically connected to the rear back door, the at least one seat, and the frame. The ECU may control the rear back door to open the rear back door. The ECU may further control the frame to separate the at least one seat from the third row of seats and move the at least one seat from inside the cabin to outside the cabin through the rear back door to allow an occupant of the at least one seat to egress from the vehicle through the rear back door. The ECU may further control the frame to move the at least one seat from outside the cabin to inside the cabin through the rear back door to allow another occupant of the at least one seat to ingress to the vehicle through the rear back door. The ECU may further control the rear back door to close the rear back door.

In one aspect, the subject matter described in this disclosure may be embodied in an automated ingress and egress system for a vehicle. The automated ingress and egress system may include a rear back door of the vehicle. The rear back door may open and close. The automated ingress and egress system may further include a platform having an original position defined by the platform facing forward relative to the vehicle and being located within a cabin of the vehicle. The automated ingress and egress system may further include a frame coupled to the platform and a floor of the vehicle. The frame may move the platform from the original position to outside the cabin through the rear back door. The automated ingress and egress system may further include an electronic control unit (ECU) electrically connected to the rear back door and the frame. The ECU may control the rear back door to open the rear back door. The ECU may further control the frame to move the platform from the original position to outside the cabin through the rear back door. The ECU may further control the frame to move the platform from outside the cabin to the original position through the rear back door. The ECU may further control the rear back door to close the rear back door.

BRIEF DESCRIPTION OF THE DRAWINGS

Other systems, methods, features, and advantages of the present disclosure will be apparent to one skilled in the art upon examination of the following figures and detailed description. Component parts shown in the drawings are not necessarily to scale and may be exaggerated to better illustrate the important features of the present disclosure. In the drawings, like reference numerals designate like parts throughout the different views.

FIG. 7 is a flow diagram of an example process for controlling the automated ingress and egress system of FIG. 1 according to an aspect of the disclosure.

DETAILED DESCRIPTION

Figure 1:
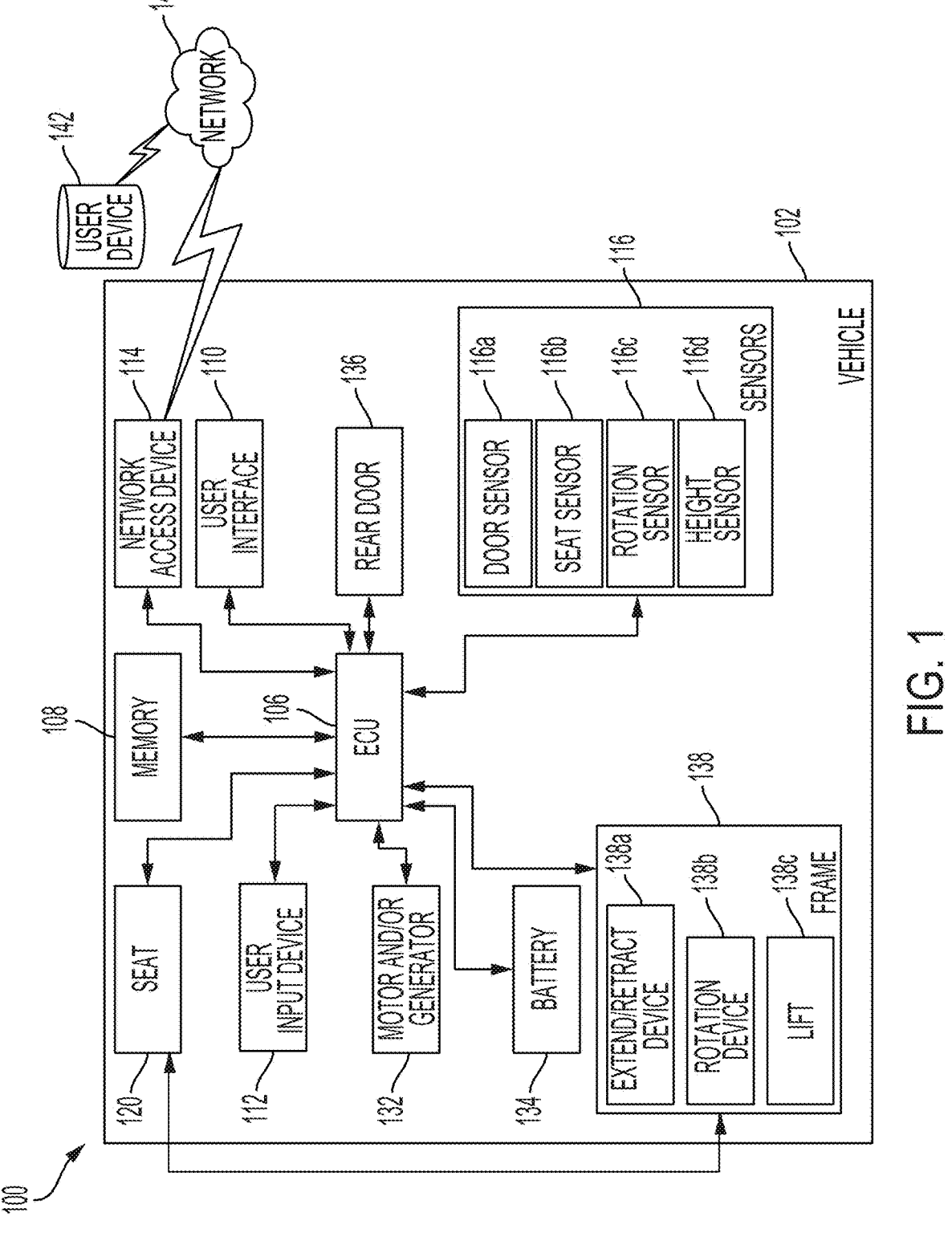
FIG. 1 is a block diagram of an example automated ingress and egress system for a vehicle according to an aspect of the disclosure.

Disclosed herein are methods, systems, devices, and/or vehicles for implementing an automated ingress and egress system. Particular embodiments of the subject matter described in this disclosure may be implemented to realize one or more of the following advantages. The automated ingress and egress system may improve accessibility of one or more seats (e.g., one or more rear seats, a third row of seats, and/or a rearmost row of seats) and/or one or more platforms of a vehicle. The automated ingress and egress system may move the one or more seats and/or the one or more platforms from inside a cabin of the vehicle to outside the cabin through a rear door (e.g., a liftgate, a tailgate, and/or a split liftgate/tailgate) of the vehicle. This may allow a passenger who is seated on the one or more seats to easily egress from the vehicle. The automated ingress and egress system may further retract the one or more seats and/or the one or more platforms from outside the cabin to inside the cabin through the rear door. This may safely return the one or more seats to inside the cabin after the passenger has vacated the one or more seats and/or may allow another passenger to easily ingress to the vehicle.

Moreover, the automated ingress and egress system may allow passengers to more easily and safely enter and/or exit the vehicle because the system is automated and removes the need to manually move a second and/or middle row of seats before the passengers may enter and/or exit the vehicle. In addition, the automated movement of the one or more seats through the rear door improves safety and accessibility by removing the need for the passengers to navigate small and/or narrow passageways through the cabin to enter and/or exit the vehicle from side doors of the vehicle.

Moreover, the automated ingress and egress system may further improve accessibility of the one or more seats by raising and/or lowering a height of the one or more seats relative to a floor of the vehicle. For example, the automated ingress and egress system may lower the height of the one or more seats after moving the one or more seats from inside the cabin to outside the cabin and may raise the height of the one or more seats prior to retracting the one or more seats from outside the cabin to inside the cabin. This may further improve accessibility for the passengers, especially children and the elderly.

Moreover, the automated ingress and egress system may further improve accessibility of the one or more seats by rotating the one or more seats (e.g., between 0-90 degrees, 0-180 degrees, and/or 0-360 degrees). For example, the automated ingress and egress system may rotate the one or more seats 180 degrees relative to an original position of the one or more seats such that when the one or more seats are outside of the cabin, the one or more seats face outwardly from a back of the vehicle. In another example, the automated ingress and egress system may rotate the one or more seats 90 degrees relative to the original position of the one or more seats such that when the one or more seats are outside of the cabin, the one or more seats face outward and perpendicular to the back of the vehicle. This may allow a passenger to easily access and/or vacate the one or more seats when, for example, the vehicle is parked along a sidewalk. By rotating 90 degrees, the passenger is able to step from the sidewalk and onto the one or more seats and/or step to the sidewalk from the one or more seats. In examples where the automated ingress and egress system is able to raise and lower the height of the one or more seats and rotate the one or more seats, accessibility for the disabled, elderly, and/or children is greatly improved. In addition, installation and/or removal of a child seat and/or lifting a child into and out of the child seat is made easier and safer.

Moreover, the automated ingress and egress system may utilize one or more sensors to monitor, detect, and/or measure a surrounding area of the vehicle to automatically adjust the height of the one or more seats and/or the degree of rotation of the one or more seats. For example, the automated ingress and egress system may receive data from the one or more sensors corresponding to the existence and/or height of a sidewalk/street and adjust the height of the one or more seats based on the received data to prevent the one or more seats from contacting the sidewalk/street, and/or adjust the degree of rotation of the one or more seats based on the received data to allow a passenger to vacate and/or sit on the one or more seats from the sidewalk.

Moreover, the one or more sensors (e.g., one or more cameras) may monitor operation of the automated ingress and egress system to ensure safe and secure ingress and egress of passengers. For example, the one or more sensors may detect unsafe conditions (e.g., an obstacle in a path of the rear door and/or the automated ingress and egress system) and may cause the automated ingress and egress system to stop and/or retreat back to a previous state. In addition, the automated ingress and egress system may display a warning on a user interface of the vehicle to alert a driver and/or on a user device via a network access device of the vehicle to alert the driver and/or a remote operator to check on a passenger and the detected unsafe condition.

FIG. 1 is a block diagram for an example ingress and egress system 100 (also can be referred to as an automated ingress and egress system 100). The ingress and egress system 100 or a portion thereof may be retrofitted, coupled to, include, or be included within a vehicle 102 or separate from the vehicle 102. The vehicle 102 may be a conveyance capable of transporting a person, an object, or a permanently or temporarily affixed apparatus. The vehicle 102 may be a self-propelled wheeled conveyance, such as a car, a sports utility vehicle, a truck, a bus, a van or other motor, battery or fuel cell driven vehicle. For example, the vehicle 102 may be an electric vehicle, a hybrid vehicle, a hydrogen fuel cell vehicle, a plug-in hybrid vehicle or any other type of vehicle that has a fuel cell stack, a motor, an engine, and/or a generator. Other examples of vehicles include bicycles, trains, planes, or boats, and any other form of conveyance that is capable of transportation. The vehicle 102 may be semi-autonomous or autonomous. That is, the vehicle 102 may be self-maneuvering and navigate without human input. An autonomous vehicle may have and use one or more sensors and/or a navigation unit to drive autonomously.

The ingress and egress system 100 and/or the vehicle 102 may include a motor and/or generator 132. The motor and/or generator 132 may be located within an engine bay of the vehicle 102. The motor and/or generator 132 may be an internal combustion engine (ICE). In this regard, the motor and/or generator 132 may combust an air and fuel mixture to provide power to the vehicle 102 and/or components of the vehicle 102 and/or the ingress and egress system 100. Accordingly, the motor and/or generator 132 can cause the vehicle 102 to accelerate, decelerate, or maintain a desired velocity. It should be understood that the motor and/or generator 132 may include combinations of an ICE and an electric motor, such as for hybrid vehicle applications for example. In examples, the motor and/or generator 132 may be an electric motor. In this regard, the motor and/or generator 132 may be an electric motor and an electric generator that converts electrical energy into mechanical power, such as torque, and converts mechanical power into electrical energy. The motor and/or generator 132 may be electrically connected to a battery 134. The motor and/or generator 132 may convert energy from the battery 134 into mechanical power, and may provide energy back to the battery 134, for example, via regenerative braking. The battery 134 may be electrically connected to the motor and/or generator 132 and may provide electrical energy to and/or receive electrical energy from the motor and/or generator 132. The battery 134 may provide electrical energy to the ingress and egress system 100.

Figure 2A:
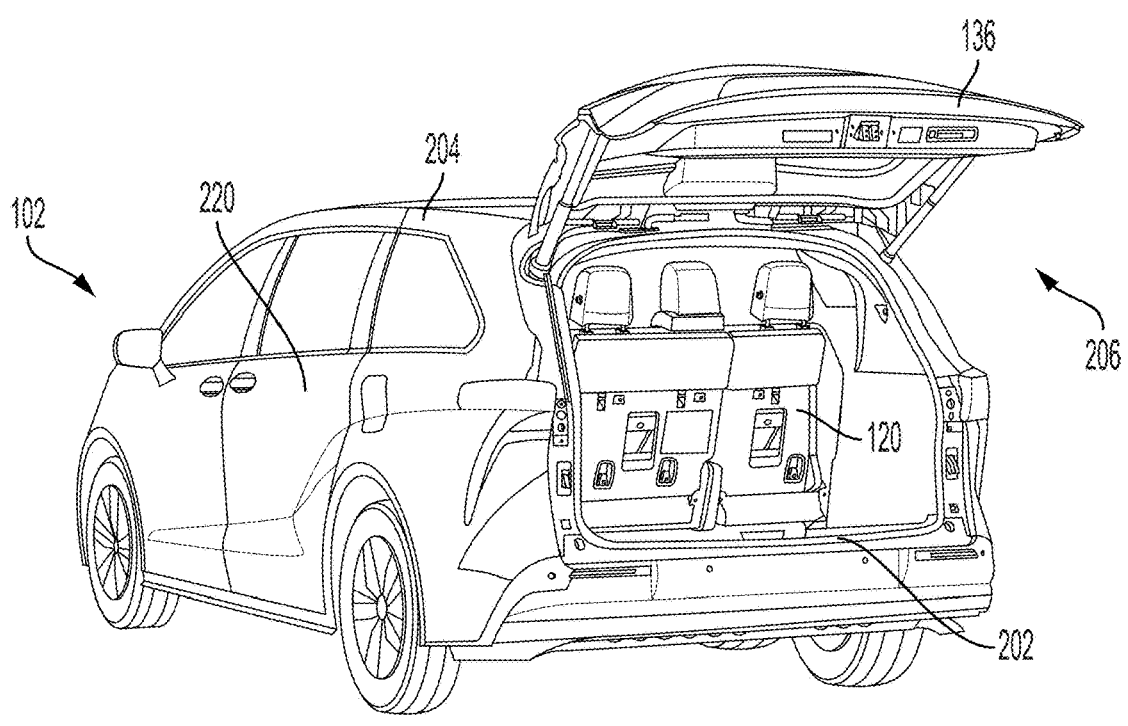
FIG. 2A is a schematic rear view of a vehicle including the automated ingress and egress system of FIG. 1 according to an aspect of the disclosure.
Figure 2B:
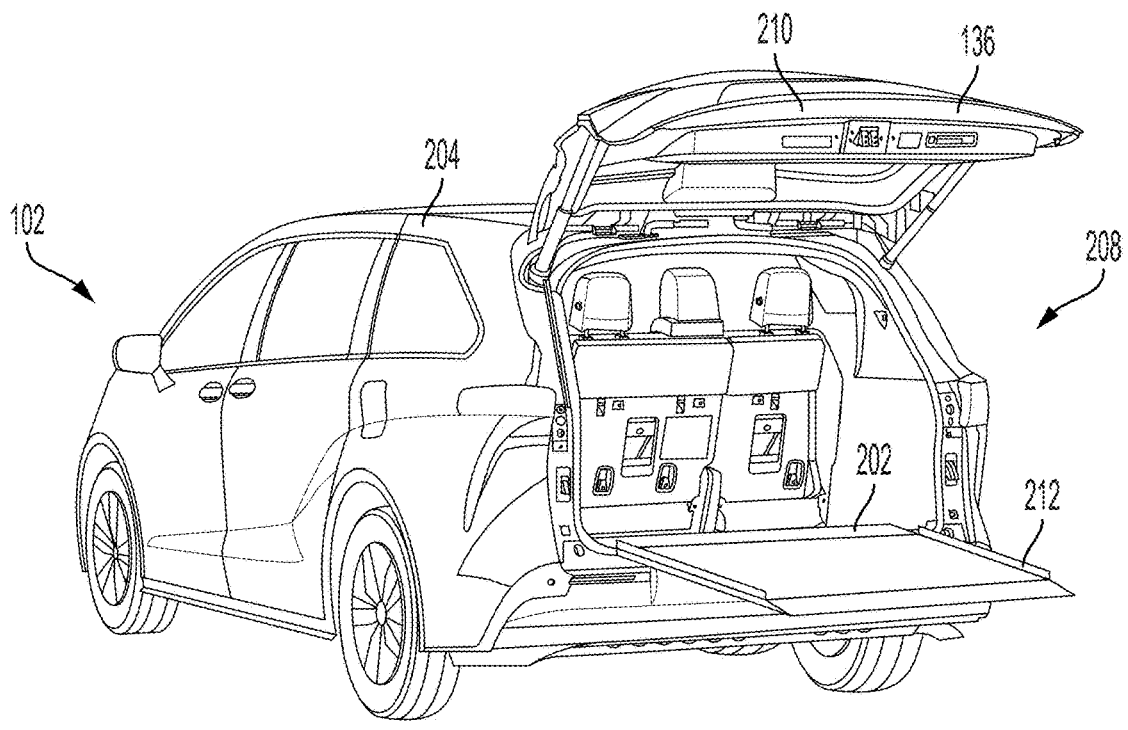
FIG. 2B is a schematic rear view of a vehicle including the automated ingress and egress system of FIG. 1 according to an aspect of the disclosure.

FIGS. 2A and 2B are schematic rear views of the vehicle 102 including the example ingress and egress system 100 of FIG. 1. With combined reference to FIGS. 1, 2A, and 2B, the ingress and egress system 100 may further include a rear door 136 (or rear back door or rear back hatch or liftgate) of the vehicle 102. The rear door 136 may be movably coupled to the rear of the vehicle 102. The rear door 136 may be designed to open from a closed position to an open position 206, and to close from the open position 206 to the closed position. The rear door 136 may be opened and/or closed manually by a user and/or may be opened and closed automatically through the use of electric motors, pneumatic cylinders, etc. In examples, the rear door 136 may be a liftgate and may be movably coupled to a roof 204 of the vehicle 102 such that the rear door 136 may open upward from the closed position to the open position 206. In examples, the rear door 136 may be a tailgate and may be movably coupled to a floor 202 of the vehicle 102 such that the rear door 136 may open and swing downward from the closed position to an alternate open position. In examples, the rear door 136 may be a split tailgate/liftgate such that an upper door half (or liftgate) 210 of the rear door 136 may be movably coupled to the roof 204 of the vehicle 102 and a lower door half (or tailgate) 212 of the rear door 136 may be movably coupled to the floor 202 of the vehicle 102, with the rear door 136 splitting to open to another open position 208 from the closed position.

The ingress and egress system 100 may further include a seat 120. The seat 120 may be movably coupled to the floor 202 of the vehicle 102. That is, the seat 120 may have anchors that bolt the seat 120 to the floor 202 when the vehicle 102 is moving to provide safety and a secure attachment means. The anchors may be automatically unlatched when the vehicle 102 is in park and when the ingress and egress system 100 is activated to move the seat 120 in and out of the vehicle 102.

In examples, the ingress and egress system 100 may include a plurality of seats. The seat 120 may be and/or may be included in a third row and/or a rearmost row of seats of the vehicle 102. The seat 120 may be designed to hold and/or secure one or more passengers of the vehicle 102. In examples, the seat 120 may be designed to hold and/or secure one or more wheelchairs with or without a passenger in the one or more wheelchairs. In examples, the seat 120 may be fitted with a platform to hold and/or secure the one or more wheelchairs and/or one or more objects.

Figure 3A:
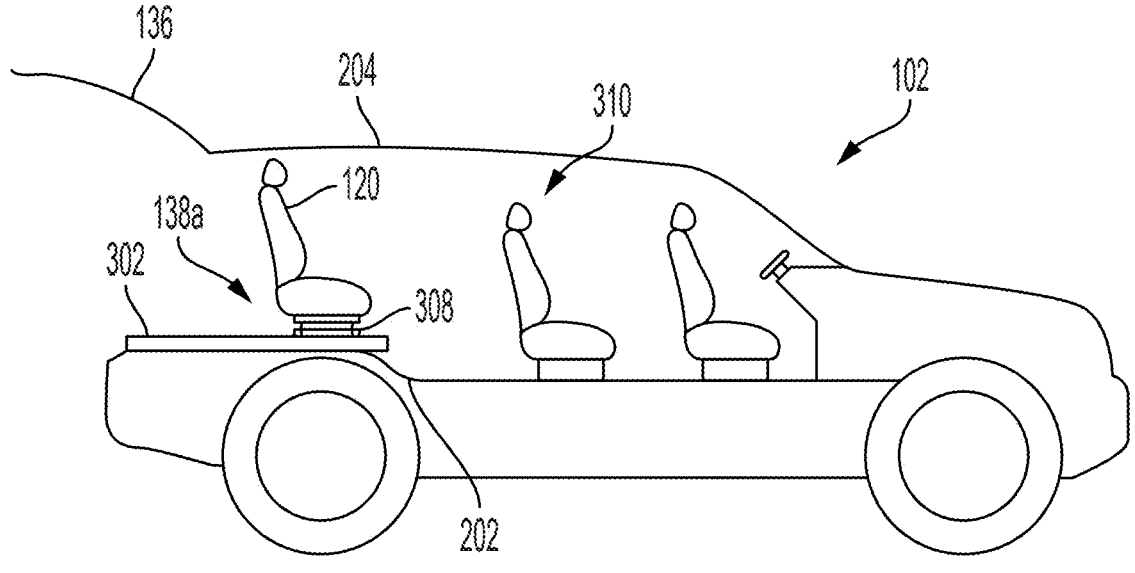
FIG. 3A is a schematic side view of a vehicle including the automated ingress and egress system of FIG. 1 according to an aspect of the disclosure.

FIG. 3A is a schematic side view of a cabin 310 of the vehicle 102 including the example ingress and egress system 100 of FIG. 1, with various components of the cabin 310 and/or the vehicle 102 not pictured to aid in illustrating certain features of the ingress and egress system 100, in examples. With combined reference to FIGS. 1, 2, and 3A, the ingress and egress system 100 may further include a frame 138. The frame (or base) 138 may be coupled to the seat 120 and/or the floor 202 of the vehicle 102. The frame 138 may move (or slide) the seat 120 from inside the cabin 310 (marked in FIG. 3A) to outside the cabin 310 through the rear door 136 and may retract (or move) the seat 120 from outside the cabin 310 to inside the cabin 310 through the rear door 136. In examples, the frame 138 may further horizontally rotate the seat 120 relative to the floor 202 of the vehicle 102 to increase the accessibility of the seat 120. In the same and/or additional examples, the frame 138 may further vertically lower and/or raise a height of the seat 120 relative to the floor 202 of the vehicle 102 to further increase the accessibility of the seat 120. In examples, the seat 120 may be designed to hold and/or secure a wheelchair. In examples, the seat 120 may be fitted with a cargo platform to hold and/or secure the wheelchair and/or one or more objects.

Figure 3B:
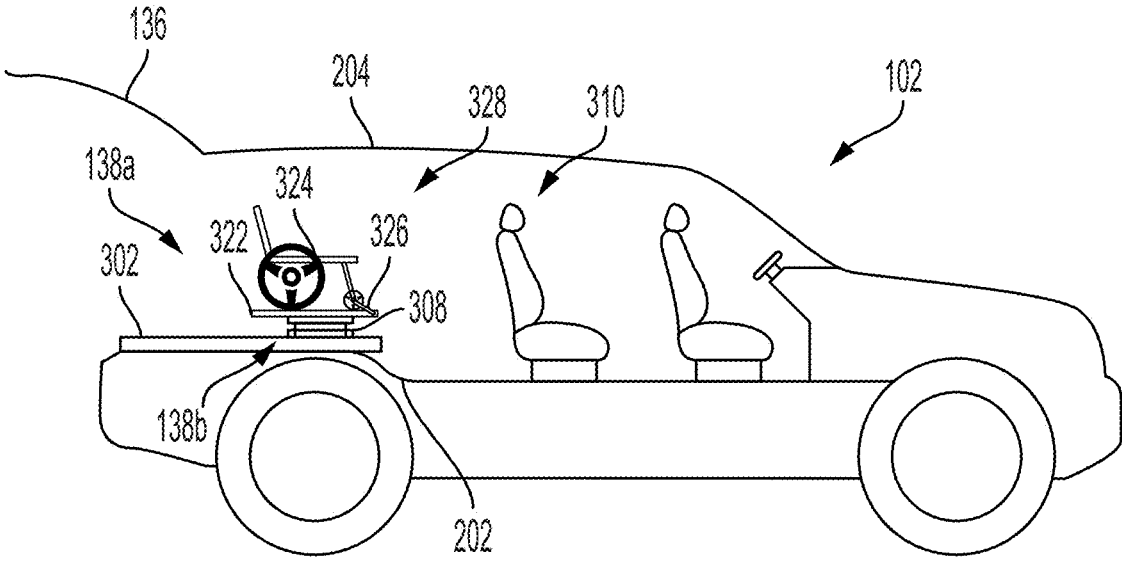
FIG. 3B is a schematic side view of a vehicle including the automated ingress and egress system of FIG. 1 according to an aspect of the disclosure.

In examples, the automated ingress and egress system 100 may further include a platform 322 as shown by FIG. 3B. The platform 322 may replace the seat 120 in examples or may be in addition to the seat 120 in examples. The platform 322 may be movably coupled to the floor 202 of the vehicle 102 and/or may be coupled to the frame 138. The platform may hold and/or secure one or more wheelchairs 324 and/or one or more objects (e.g., a box, a suitcase, etc.). The platform 322 may include one or more anchor points 326. The one or more anchor points 326 may be and/or include one or more tie down straps, one or more securing loops, and/or other anchoring pieces that are configured to secure the one or more wheelchairs 324 and/or the one or more objects. The automated ingress and egress system 100 may control the platform 322 in the same or similar way as the seat 120 according to the examples herein. For example, the frame 138 may move (or slide) the platform 322 from inside the cabin 310 to outside the cabin 310 through the rear door 136 and may retract (or move) the platform 322 from outside the cabin 310 to inside the cabin 310 through the rear door 136. In examples, the frame 138 may further horizontally rotate the platform 322 relative to the floor 202 of the vehicle 102 to increase the accessibility of the platform 322. In the same and/or additional examples, the frame 138 may further vertically lower and/or raise a height of the platform 322 relative to the floor 202 of the vehicle 102 to further increase the accessibility of the platform 322.

Figure 3C:
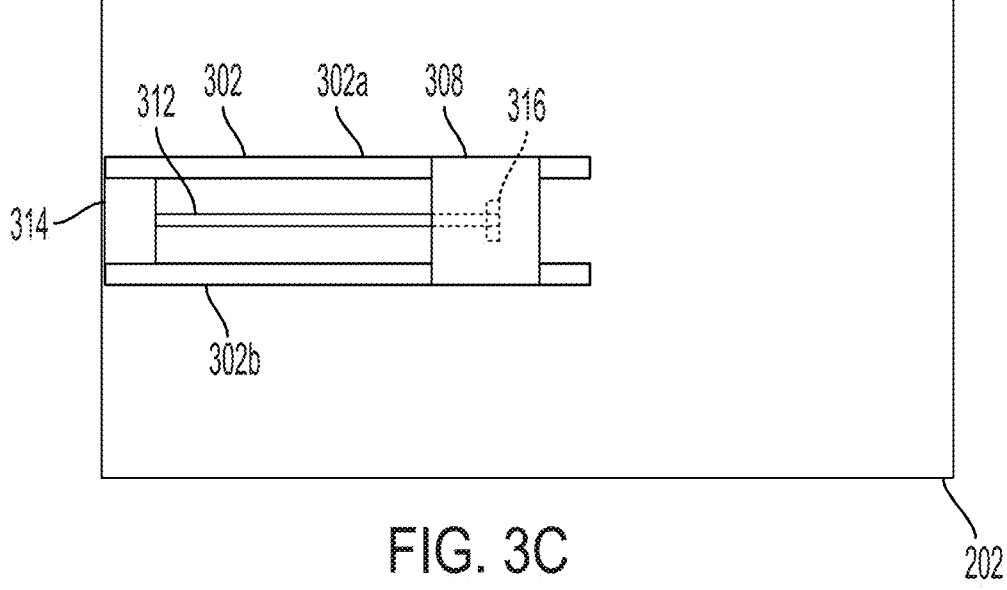
FIG. 3C is a schematic top view of a floor of a vehicle including the automated ingress and egress system of FIG. 1 according to an aspect of the disclosure.
Figure 3D:
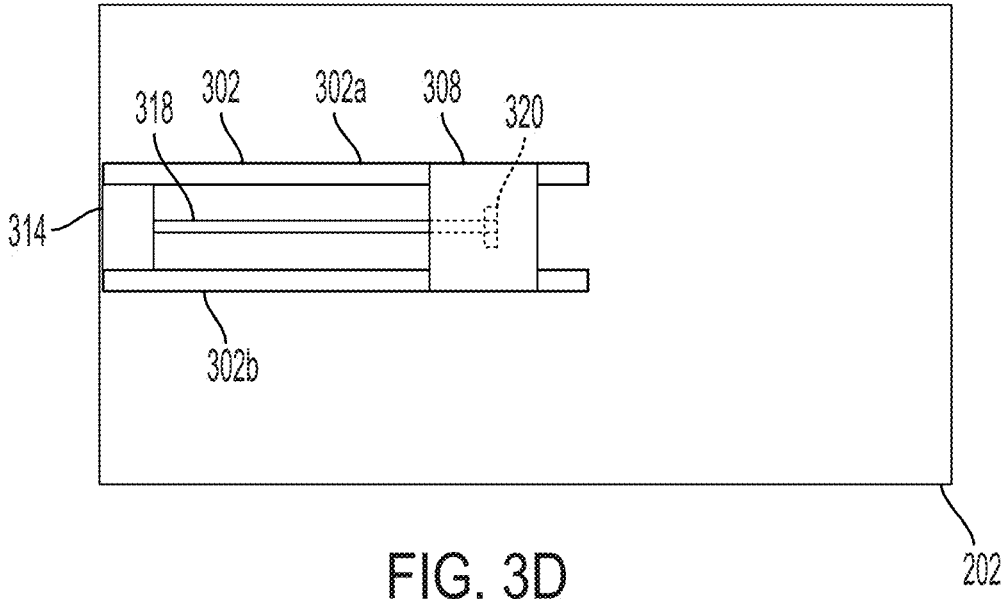
FIG. 3D is a schematic top view of a floor of a vehicle including the automated ingress and egress system of FIG. 1 according to an aspect of the disclosure.

To move and retract the seat 120 and/or the platform 322, the frame 138 may include an extend/retract device 138*a* coupled to the seat 120, the platform 322, and/or the floor 202. In examples, the extend/retract device 138*a* may include one or more rails 302 coupled to the floor 202 of the vehicle 102 and a base 308 movably coupled to the one or more rails 302. The base 308 may be configured to move (or slide) along the one or more rails 302 through the use of electric motors, bearings, wheels, gears, belts, pulleys, and/or other mechanical and electrical components to move and/or retract the seat 120 and/or the platform 322 from inside and/or outside the cabin 310. In examples, the one or more rails 302 may include a first rail 302*a* and a second rail 302*b* as shown by FIG. 3C. The first rail 302*a* may be parallel to the second rail 302*b*, in examples. In examples, the base 308 may move (or slide) along the one or more rails 302 through the use of one or more threaded rods 312 coupled to the base 308 and one or more electric motors 314. The one or more electric motors 314 may be coupled to the floor 202, the base 308, and/or the one or more rails 302 and may be configured to rotate the one or more threaded rods in one or more (e.g., two) directions. In examples, the one or more threaded rods 312 may interface with a base nut 316 coupled to the base 308 such that when the one or more electric motors 314 rotate the one or more threaded rods 312, the base 308 may slide in a rearward direction or a forward direction along the one or more rails 302. In examples, the base 308 may move (or slide) along the one or more rails 302 through the use of one or more belts (or chains) 318 that are driven by the one or more electric motors 314 as shown in FIG. 3D. For example, the one or more belts 318 may be coupled to a pulley (or anchor) 320 and may be rotated (or moved) by the one or more electric motors 314 such that the base 308 may slide in the rearward direction or the forward direction along the one or more rails 302.

Figures 4A, 4B:
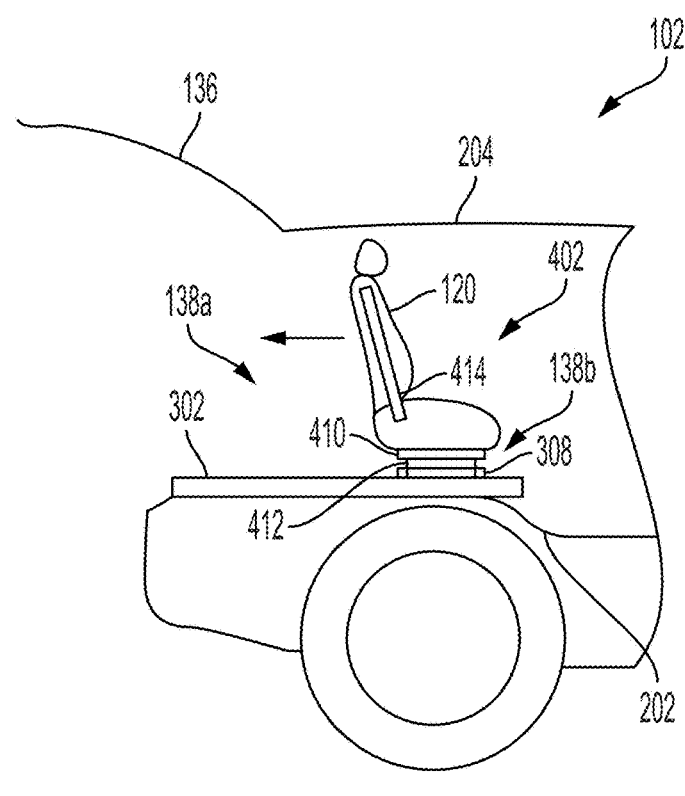
FIG. 4A is a schematic side view of a vehicle including the automated ingress and egress system of FIG. 1 and illustrates movement of a seat according to an aspect of the disclosure.
FIG. 4B is a schematic side view of a vehicle including the automated ingress and egress system of FIG. 1 and illustrates a seat being moved out of a cabin of the vehicle according to an aspect of the disclosure.

FIGS. 4A and 4B are schematic side views of portions of the vehicle 102 with the seat 120 in an original (or forward) position 402 and a rearward position 404, respectively. With combined reference to FIGS. 1, 3, 4A, and 4B, the extend/retract device 138*a* may move (or slide) the seat 120 along the one or more rails 302 from the original position 402 (i.e., the seat 120 is facing forward and is positioned within a predetermined distance (e.g., 0-5 feet) from another seat that is in front of the seat 120) as shown in FIG. 4A, to the rearward position 404 (i.e., the seat 120 is at and/or near the rear of the vehicle 102, and/or the seat 120 is outside of the cabin 310) as shown by FIG. 4B. In examples, to move the seat 120 outside of the cabin 310, the one or more rails 302 may automatically lengthen to protrude outside of the cabin 310 as shown by FIG. 4B. For example, a piston 406 may be coupled to one or more rail extension portions 408 and may push or pull on the one or more rail extension portions 408 to change a length of the one or more rails 302. In examples, the extend/retract device 138*a* may move (or slide) the platform 322 along the one or more rails 302 from an original position 328 (marked in FIG. 3B) (i.e., the platform 322 is facing forward and is positioned within a predetermined distance (e.g., 0-5 feet) from a seat that is in front of the platform 322), to the rearward position 404.

Figure 5:
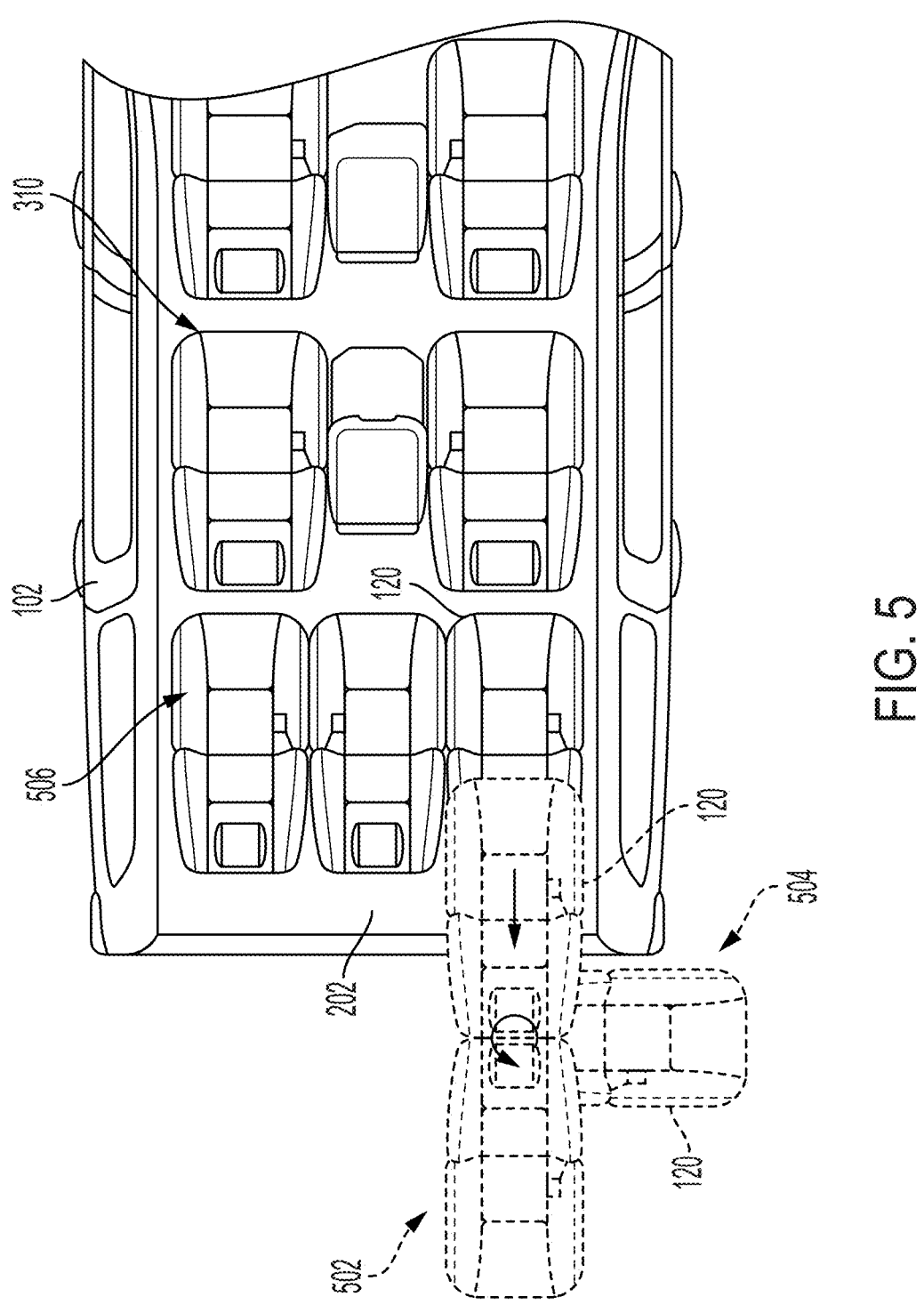
FIG. 5 is a schematic top view of a vehicle including the automated ingress and egress system of FIG. 1 with a roof and a rear door of the vehicle not pictured to better illustrate certain features of the automated ingress and egress system according to an aspect of the disclosure.

FIG. 5 is a schematic top view of the vehicle 102 without the roof 204 and the rear door 136 to aid in illustrating certain features of the ingress and egress system 100, in examples. With combined reference to FIGS. 1, 3, 4A, 4B, and 5, when the extend/retract device 138*a* moves the seat

120 rearward, the seat 120 may split and/or decouple from a bench seat 506. The seat 120 may include, be included with, and/or be separate from the bench seat 506. The bench seat 506 may be a third row bench seat and/or a rearmost row bench seat of the vehicle 102. The bench seat 506 may include one or more seats that are coupled to the frame 138. The frame 138 and/or the extend/retract device 138*a* may secure the seat 120 and/or the bench seat 506 such that the seat 120 is fixed and secure in the original position 402 when not being moved by the extend/retract device 138*a*. In examples, the seat 120 may couple to the bench seat 506 through clamps, latches, and/or other anchor points that may automatically engage and/or disengage to secure the seat 120 and/or allow the seat 120 to move rearward.

The frame 138 may further include a rotation device 138*b* to rotate the seat 120 and/or the platform 322. The rotation device 138*b* may be coupled to a bottom portion of the seat 120, the platform 322, the extend/retract device 138*a*, and/or the base 308. The rotation device 138*b* may horizontally rotate the seat 120 (e.g., between 0-90 degrees, 0-180 degrees, and/or 0-360 degrees) relative to the original position 402 of the seat 120. In examples, the rotation device 138*b* may horizontally rotate the platform 322 (e.g., between 0-90 degrees, 0-180 degrees, and/or 0-360 degrees) relative to the original position 328 of the platform 322. In examples, the rotation device 138*b* may include a housing 410 that may house a rotating plate 412. The rotating plate 412 may be a gear or sprocket that interfaces with an electric motor and/or a belt of the rotation device 412 to rotate the seat 120 and/or the platform 322. By rotating the seat 120 and/or the platform 322, the rotation device 138*b* may improve accessibility of the seat 120 and/or the platform 322 during ingress and egress from the vehicle 102. For example, when the ingress and egress system 100 moves the seat 120 rearward and outside of the cabin 310, the rotation device 138*b* may rotate the seat 180 degrees relative to the original position 402 of the seat 120 such that the seat 120 is in an outwardly facing position 502 (i.e., the seat 120 faces outwardly from the rear of the vehicle 102, as shown by FIG. 5). In examples, when the ingress and egress system 100 moves the seat 120 rearward and outside of the cabin 310, the rotation device 138*b* may rotate the seat 90 degrees and/or 270 degrees relative to the original position 402 of the seat 120 such that the seat 120 is in a side facing position 504 (i.e., the seat 120 faces perpendicular to the rear of the vehicle 102, as shown by FIG. 5).

Figure 6A:
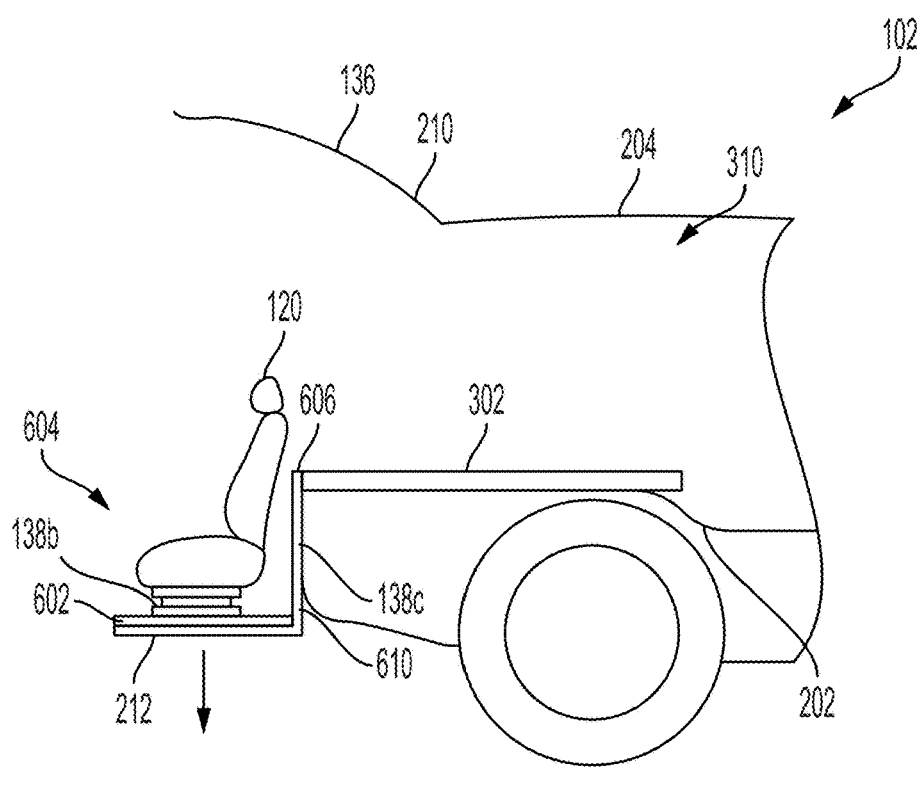
FIG. 6A is a schematic side view of a vehicle including the automated ingress and egress system of FIG. 1 and illustrates changing a height of a seat according to an aspect of the disclosure.
Figure 6B:
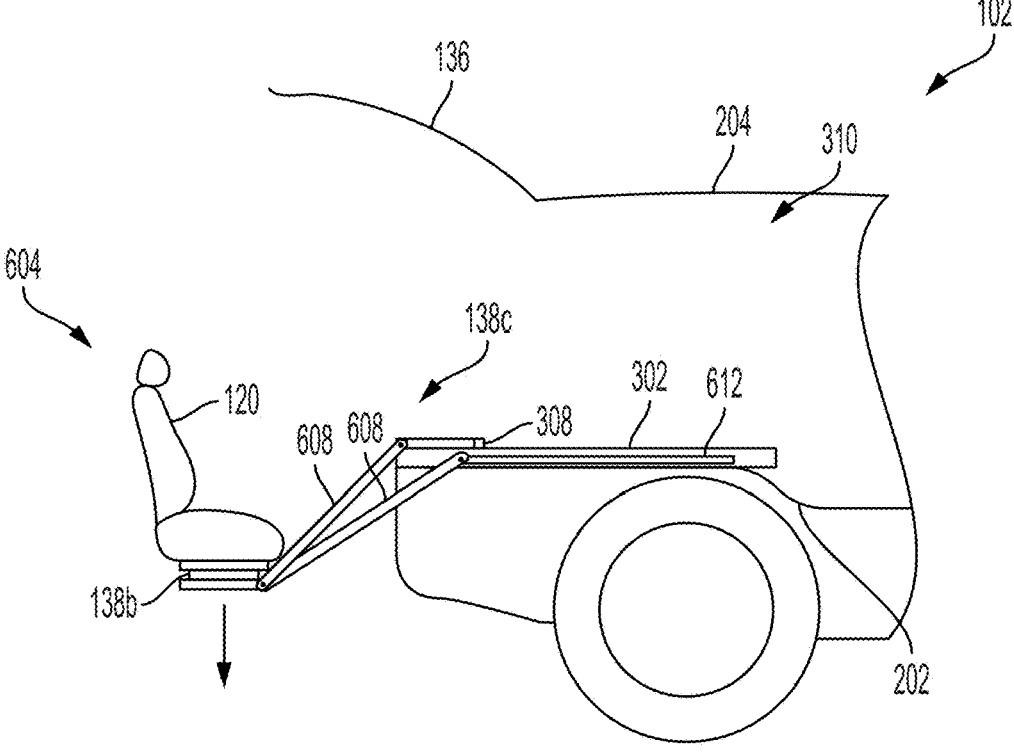
FIG. 6B is a schematic side view of a vehicle including the automated ingress and egress system of FIG. 1 and illustrates changing a height of a seat and/or moving the seat out of a cabin of the vehicle according to an aspect of the disclosure.

FIGS. 6A and 6B are schematic side views of portions of the vehicle 102 and the example ingress and egress system 100 of FIG. 1 with the seat 120 in a lowered position 604. To vertically lower and/or raise the height of the seat 120 and/or the platform 322 (marked in FIG. 3B) relative to the floor 202 of the vehicle 102, the frame 138 may further include a lift (or life device) 138*c*. The lift 138*c* may be coupled to the floor 202, the base 308, the rear of the vehicle 102, and/or the lower door half 212. In examples, the lift 138*c* may include electric motors, bearings, wheels, gears, belts, pulleys, and/or other mechanical and electrical components to lower and/or raise the height of the seat 120 and/or the platform 322.

In examples, the lift 138*c* may vertically lower and/or raise the height of the seat 120 by lowering and/or raising the lower door half 212, as shown by FIG. 6A. In examples, the lift 138*c* may vertically lower and/or raise the height of the platform 322 by lowering and/or raising the lower door half 212. For example, when the ingress and egress system 100 moves the seat 120 rearward, the base 308 may slide along the one or more rails 302 to the rear of the vehicle 102 such that the seat 120 also slides to the rear of the vehicle 102. The base 308 may slide across a transition point 606 and onto one or more extension rails 602 of the lift 138*c* and/or the extend/retract device 138*a*. The one or more extension rails 602 may be coupled to the lower door half 212 of the rear door 136 and may be separate from and/or removably coupled to the one or more rails 302 at and/or near the transition point 606. Once the base 308 and the seat 120 are positioned atop the one or more extension rails 602 and the lower door half 212, the lift 138*c* may lower the lower door half 212 such that the seat 120 lowers to the ground outside of the vehicle 102 to further increase accessibility of the seat 120. For example, the lift 138*c* may lower the lower door half 212 such that a passenger sitting in the seat 120 may have their feet touch the ground outside the vehicle 102 to allow the passenger to exit the seat 120 easily and safely. In examples, the lift 138*c* may include one or more lift rails 610. The lower door half 212 may be movably coupled to the one or more lift rails 610. The lower door half 212 may be moved up and down the one or more lift rails 610 by a belt and/or a chain coupled to an electric motor and/or by a piston. In examples, the one or more lift rails 610 may be telescoping such that the one or more lift rails 610 extend and retract when lowering or raising the lower door half 212.

In examples, the lift 138*c* may vertically lower and/or raise the height of the seat 120 by using an arm 608, as shown by FIG. 6B. In examples, the lift 138*c* may vertically lower and/or raise the height of the platform 322 by using the arm 608. The arm 608 may include one or more linkages (e.g., 2-bar linkage, 3-bar linkage, a 4-bar linkage, a 5-bar linkage, and/or other linkages) coupled to the seat 120, the platform 322, the one or more rails 302, the floor 202, and/or the base 308. The arm 608 may slide along a track 612 in the one or more rails 302 and may move with the base 308 to move (or lift) the seat 120 and/or the platform 322 out of the cabin 310 and toward the ground. For example, when the ingress and egress system 100 moves the seat 120 rearward, the base 308 may slide along the one or more rails 302 to the rear of the vehicle 102 such that the seat 120 also slides to the rear of the vehicle 102. The base 308 may stop at the rear of the vehicle 102 such that the seat 120 is also positioned at the rear of the vehicle 102. The lift 138*c* may lower and/or lift the seat 120 outside of the cabin 310 and toward the ground to further increase accessibility of the seat 120. In some examples where the lift 138*c* includes the arm 608, the ingress and egress system 100 may not include the extend/retract device 138*a* and instead may use the arm 608 to move (or lift) the seat 120 from the original position 402 to outside the cabin 310.

Turning again to FIG. 1, the ingress and egress system 100 may further include one or more sensors 116. The one or more sensors 116 may include a door sensor 116*a*, a seat sensor 116*b*, a rotation sensor 116*c*, and/or a height sensor 116*d*.

The door sensor 116*a* may be coupled to the rear door 136, the upper door half 210, the lower door half 212, and/or the rear of the vehicle 102. In examples, the ingress and egress system 100 may include a plurality of door sensors. The door sensor 116*a* may be and/or include a camera, a lidar sensor, a radar sensor, and/or a sonar sensor. The door sensor 116*a* may measure, detect, and/or determine whether one or more objects are in a first vicinity of the vehicle 102 to prevent the rear door 136 from coming into contact with the one or more objects when the rear door 136 is opened and/or closed. The first vicinity may be a first predetermined area that is based on the dimensions and/or the opening area (or swing path) of the rear door 136. In examples, when the door sensor 116*a* detects the one or more objects, the ingress and egress system 100 (e.g., via an ECU 106) may stop and/or prevent the rear door 136 from opening and/or closing. In examples, the door sensor 116*a* may monitor the passenger for safety while the ingress and egress system 100 is operating. For example, the door sensor 116*a* may determine whether the passenger will come into contact with the rear door 136 and/or the one or more. In examples, when the door sensor 116*a* determines that the passenger will come into contact with the rear door 136 and/or the one or more objects, the ingress and egress system 100 (e.g., via the ECU 106) may stop and/or prevent the rear door 136 from opening and/or closing and/or may stop the ingress and egress system 100.

The seat sensor 116*b* may be coupled to the seat 120 and/or the rear of the vehicle 102. In examples, the ingress and egress system 100 may include a plurality of seat sensors. The seat sensor 116*b* may be and/or include a seat belt sensor, an occupant (or weight) sensor, a camera, a lidar sensor, a radar sensor, and/or a sonar sensor. The seat sensor 116*b* may measure, detect, and/or determine whether one or more additional objects are in a second vicinity of the vehicle 102 to prevent the seat 120 from coming into contact with the one or more additional objects when the seat 120 is being moved from inside/outside the cabin 310 to outside/inside the cabin 310. The second vicinity may be a second predetermined area that is based on the dimensions and/or movement path of the seat 120. In examples, when the seat sensor 116*b* detects the additional one or more objects, the ingress and egress system 100 (e.g., via the ECU 106) may stop and/or prevent the seat 120 moving from inside/outside the cabin 310 to outside/inside the cabin 310.

In examples, the seat sensor 116*b* may detect and/or determine whether an occupant of the seat 120 is secured with a seat belt 414 (marked in FIG. 4A) of the seat 120. For example, before the ingress and egress system 100 moves the seat 120 from inside the cabin 310 to outside the cabin 310 and/or from outside the cabin 310 to inside the cabin 310, the ingress and egress system 100 may determine, via the seat sensor 116*b*, whether the seat 120 is occupied by a passenger (e.g., by detecting a weight of the passenger). If the seat 120 is occupied by a passenger, the ingress and egress system 100 may determine, via the seat sensor 116*b*, whether the passenger is secured by the seat belt 414 of the seat 120. When the passenger is not secured by the seat belt 414, the ingress and egress system 100 may prevent and/or stop the seat 120 from moving until the passenger is secured by the seat belt 414.

The rotation sensor 116*c* may be coupled to the seat 120, the platform 322, the rear of the vehicle 102, and/or a side of the vehicle 102. In examples, the ingress and egress system 100 may include a plurality of rotation sensors. The rotation sensor 116*c* may be and/or include a camera, a lidar sensor, a radar sensor, a sonar sensor, a GPS sensor, a localization sensor, and/or an object sensor. The rotation sensor 116*c* may measure, detect, and/or determine whether a sidewalk is behind and/or alongside the vehicle 102. In examples, the rotation sensor 116*c* may be configured to indicate a sidewalk orientation corresponding to whether a sidewalk is behind and/or alongside the vehicle 102. For example, when the vehicle 102 is backed up to a sidewalk and parked, the rotation sensor 116*c* may detect and/or indicate that the sidewalk is behind the vehicle 102 and when the vehicle 102 is parked alongside the sidewalk, the rotation sensor 116*c* may detect and/or indicate that the sidewalk is alongside the vehicle 102. In examples, the ingress and egress system 100 may determine and/or set (e.g., via the ECU 106) a degree of rotation of the seat 120 and/or the platform 322 based on the sidewalk being indicated as behind and/or alongside the vehicle 102. For example, the ingress and egress system 100 may set the degree of rotation to 180 degrees (i.e., the seat 120 may be rotated by the rotation device 138b 180 degrees relative to the original position 402 of the seat 120) when the rotation sensor 116c indicates the sidewalk is behind the vehicle 102. In another example, the ingress and egress system 100 may set the degree of rotation to 90 and/or 270 degrees (i.e., the seat 120 may be rotated by the rotation device 138b 90 and/or 270 degrees relative to the original position 402 of the seat 120) when the rotation sensor 116c indicates the sidewalk is alongside the vehicle 102.

The height sensor (or distance sensor) 116d may be coupled to the seat 120, the platform 322, the lower door half 212, and/or the rear of the vehicle 102. In examples, the ingress and egress system 100 may include a plurality of height sensors. The height sensor 116d may be and/or include a camera, a lidar sensor, a radar sensor, and/or a sonar sensor. The height sensor 116d may measure, detect, and/or determine a distance between the seat 120 and/or the platform 322 and the ground (e.g., a sidewalk, a street, etc.) when the seat 120 and/or the platform 322 is outside of the cabin 310. In examples, the ingress and egress system 100 may set and/or adjust (e.g., via the ECU 106) the height of the seat 120 and/or the platform 322 when moving the seat 120 from inside the cabin 310 to outside the cabin 310 based on a predetermined distance (e.g., 0 inches, 5 inches, 1 foot, 3 feet, and/or a length between 0 inches and 3 feet) and the distance between the seat 120 and/or the platform 322 and the ground. For example, the ingress and egress system 100 may raise and/or lower the height of the seat 120 when the seat 120 is outside the cabin 310 such that the seat 120 is at the predetermined distance from the ground to further increase accessibility of the seat 120.

The ingress and egress system 100 may further include a user input device 112. The user input device 112 may be coupled to the seat 120, the platform 322, the exterior 220 of the vehicle 102, and/or the cabin 310 of the vehicle 102. The user input device 112 may be and/or include one or more buttons, one or more switches, one or more dials, one or more touch screens, one or more gesture control sensors, one or more voice control sensors, and/or any other input devices. The user input device 112 may receive and/or detect user input from a user (e.g., a driver and/or passenger) to start and/or stop the ingress and egress system 100.

The ingress and egress system 100 may further include one or more processors, such as the electronic control unit (ECU) 106. The ECU 106 may be implemented as a single ECU or in multiple ECUs. The ECU 106 may be electrically connected to some or all of the components of the vehicle 102 and/or the ingress and egress system 100. The ECU 106 may be electrically connected to the rear door 136, the seat 120, the platform 322, the frame 138, the one or more sensors 116, the user input device 112, a memory 108, a network access device 114, and/or a user interface 110. The ECU 106 may include one or more processors (or controllers) specifically designed for controlling operations of the vehicle 102, such as opening and closing the rear door 136.

The ingress and egress system 100 may further include the memory 108. The memory 108 may be electrically connected to the ECU 106. In examples, the memory 108 may be communicatively coupled (e.g., via a network 140) to the ECU 106 such that the memory 108 is remote from the ECU 106 and/or the vehicle 102. In other examples, the memory 108 may be electrically connected to the ECU 106 and a remote memory may be communicatively coupled to the ECU 106, with the remote memory having similar, additional, and/or different functions as the memory 108 (e.g., greater storage capacity, enabling over-the-air updates, etc.). The memory 108 may store instructions to execute on the ECU 106 and may include one or more of a random access memory (RAM) or other volatile or non-volatile memory. The memory 108 may be a non-transitory memory or a data storage device, such as a hard disk drive, a solid-state disk drive, a hybrid disk drive, or other appropriate data storage, and may further store machine-readable instructions, which may be loaded and executed by the ECU 106. The memory 108 may store vehicle parameters (e.g., vehicle weight, transmission gear information, etc.). The memory 108 may further store the dimensions of the rear door 136, the dimensions of the seat 120, dimensions of the platform 322, the predetermined distance, and/or other parameters used by the one or more sensors 116, the frame 138, and/or the ECU 106 to operate the ingress and egress system 100 such as the swing path of the rear door 136 and/or the movement path of the seat 120 and/or the platform 322.

The ingress and egress system 100 may further include the network access device 114. The network access device 114 may be electrically connected to the ECU 106 and may include a communication port or channel, such as one or more of a Wi-Fi unit, a Bluetooth® unit, a Radio Frequency Identification (RFID) tag or reader, a DSRC unit, and/or a cellular network unit for accessing the network 140 (e.g., CDMA, GSM, 3G, 4G, 5G, etc.). The network access device 114 may transmit data to and receive data from devices and systems not directly connected to the vehicle 102. For example, the ECU 106 may communicate with a user device 142 (e.g., a key fob, a mobile device, phone, tablet, laptop, etc.) through the network access device 114. In examples, a user (e.g., the owner of the vehicle 102) may use the user device 142 to communicate with the ECU 106 to start the vehicle 102 and/or to activate the ingress and egress system 100 to allow a passenger to ingress to and/or egress from the vehicle 102.

The ingress and egress system 100 may further include the user interface 110. The user interface 110 may provide an interface to a passenger of the vehicle 102 to interact with and/or receive output from the ECU 106. The user interface 110 may have a user interface element, such as a touchscreen with a button, knob, graphical user interface (GUI) and/or other input/output device coupled to the ECU 106 to provide input and/or output from the ECU 106, such as to display a notification and/or provide an indicator. The user interface 110 may display a message (e.g., an error and/or warning message) when the ingress and egress system 100 is activated but the door sensor 116a and/or the seat sensor 116b detect the one or more objects and/or the one or more additional objects in the first vicinity and/or the second vicinity of the vehicle 102. In examples, the user interface 110 may enable a passenger of the vehicle 102 to adjust and/or set the degree of rotation of the seat 120 and/or the height of the seat 120 when the seat 120 is outside of the cabin 310.

FIG. 7 is a flow diagram of an example process 700 for automated ingress to or egress from a vehicle. One or more computers or one or more data processing apparatuses, for example, the ECU 106 of the ingress and egress system 100 of FIG. 1, appropriately programmed, may implement the process 700. For ease of description, the process 700 is described below with reference to FIGS. 1, 2A, 2B, 3A, 3B, 3C, 3D, 4A, 4B, 5, 6A, and 6B. The process 700 of the present disclosure, however, is not limited to use of the exemplary ingress and egress systems of FIGS. 1, 2A, 2B, 3A, 3B, 3C, 3D, 4A, 4B, 5, 6A, and 6B.

The ingress and egress system 100 may detect and/or receive, via the user input device 112, user input (702). The user input device 112 may receive the user input and then provide and/or output the user input to the ECU 106. In examples, the ingress and egress system 100 may detect and/or receive, via the network access device 114, the user input from the user device 142. The user input may indicate that a passenger wishes to ingress to or egress from the vehicle 102.

In response to receiving the user input, the ingress and egress system 100 may determine, via the door sensor 116a and/or the seat sensor 116b, whether the rear door 136 will contact one or more objects if the rear door 136 is opened and/or whether the seat 120 will contact one or more additional objects if the seat 120 (and/or the platform 322) is moved rearward (704). The ECU 106 may determine whether the rear door 136 will contact the one or more objects by receiving information (or spatial data) of the one or more objects in the first vicinity of the vehicle 102 and calculating whether the rear door 136 will contact the one or more objects based on the dimensions of the rear door 136 that are stored in the memory 108. The first vicinity being the swing path of the rear door 136 when opened and/or closed. The ECU 106 may determine whether the seat 120 (and/or the platform 322) will contact the one or more additional objects by receiving information (or spatial data) of the one or more additional objects in the second vicinity of the vehicle 102 and calculating whether the seat 120 (and/or the platform 322) will contact the one or more additional objects based on the dimensions of the seat 120 (and/or the platform 322) that are stored in the memory 108. The second vicinity being the movement path of the seat 120 (and/or the platform 322) when moved from the original position 402 to outside the cabin 310. If the answer is no, the process 700 may proceed to step 708. In examples, the ECU 106 may further determine, via the seat sensor 116b, whether an occupant is seated within the seat 120. If the ECU 106 determines that the occupant is seated within the seat 120, the ECU 106 may further determine, via the seat sensor 116b, whether the occupant is secured by the seat belt 414 of the seat 120. When the occupant is not secured by the seat belt 414, the ECU 106 may prevent and/or stop the seat 120 from being moved and/or may output, via the user interface 110, a warning indicating that the occupant is not secured.

If the answer in step 704 is yes, the ingress and egress system 100 may output, via the user interface 110 and/or the user device 142, a message indicating the rear door 136 cannot be opened and/or the seat 120 (and/or the platform 322) cannot be moved because of one or more hazards and/or obstructions in the swing path of the rear door 136 and/or the movement path of the seat 120 (and/or the platform 322) (706).

The ingress and egress system 100 may control the rear door 136 to open the rear door 136 (708). The rear door 136 may swing upwards to open. In examples, the upper door half 210 of the rear door 136 may split from the lower door half 212 of the rear door 136 such that the upper door half 210 swings upwards to open and the lower door half 212 swings downward to open.

The ingress and egress system 100 may control the frame 138 to move the seat 120 (and/or the platform 322) from the original position 402 to outside of the cabin 310 through the rear door 136 (710). To move the seat 120 from the original position 402 to outside of the cabin 310, the extend/retract device 138a of the frame 138 may move (or slide) the seat 120 rearward along the one or more rails 302 and onto the lower door half 212 of the rear door 136. In examples, the lift 138c may lift and/or move the seat 120 (and/or the platform 322) rearward and outside of the cabin 310. In examples, the seat 120 may first split and/or decouple from the bench seat 506 before the lift 138c and/or the extend/ retract device 138a moves the seat 120 rearward.

The ingress and egress system 100 may receive, via the height sensor 116d, a measurement corresponding to a distance between the seat 120 (and/or the platform 322) and the ground outside of the vehicle 102 (712).

The ingress and egress system 100 may control the frame 138 to lower or raise the seat 120 (and/or the platform 322) based on the measurement to increase the accessibility of the seat 120 (and/or the platform 322) (714). To lower or raise the seat 120 (and/or the platform 322), the lift 138c of the frame 138 may lower and/or raise the lower door half 212 of the rear door 136 to change the height of the seat 120 (and/or the platform 322) relative to the floor 202 of the vehicle 102. The lift 138c may lower and/or raise the lower door half 212 and/or the seat 120 (and/or the platform 322) such that the measurement equals a predetermined distance. The predetermined distance may be stored in the memory 108 and/or may be set by a passenger via the user input device 112, the user interface 110, and/or the user device 142. In examples, the arm 608 of the lift 138c may lower and/or raise the seat 120 (and/or the platform 322) to change the height of the seat 120 (and/or the platform 322) relative to the floor 202 of the vehicle 102.

The ingress and egress system 100 may receive, via the rotation sensor 116c, an output indicating that a sidewalk is behind or alongside the vehicle 102 (716). In examples, the output may indicate that no sidewalk is detected and/or a sidewalk is detected behind and alongside the vehicle 102.

The ingress and egress system 100 may control the frame 138 to rotate the seat 120 (and/or the platform 322) relative to an original forward facing position of the seat 120 (and/or the platform 322) based on the output from the rotation sensor 116c to increase accessibility of the seat 120 (and/or the platform 322) (718). The rotation device 138b of the frame 138 may rotate the seat 120 (and/or the platform 322) 180 degrees relative to the original position 402 of the seat 120 when the rotation sensor 116c indicates the sidewalk is behind the vehicle 102 and/or indicates there is no sidewalk. The rotation device 138b may rotate the seat 120 90 degrees and/or 270 degrees relative to the original position 402 of the seat 120 when the rotation sensor 116c indicates the sidewalk is alongside the vehicle 102. In examples, a passenger may set the degree of rotation of the seat 120 (and/or the platform 322) through the user interface 110, the user input device 112, and/or the user device 142. Once the seat 120 has been rotated and/or lowered by the frame 138, a passenger may vacate the seat 120 and/or may sit on the seat 120.

Figure 8:
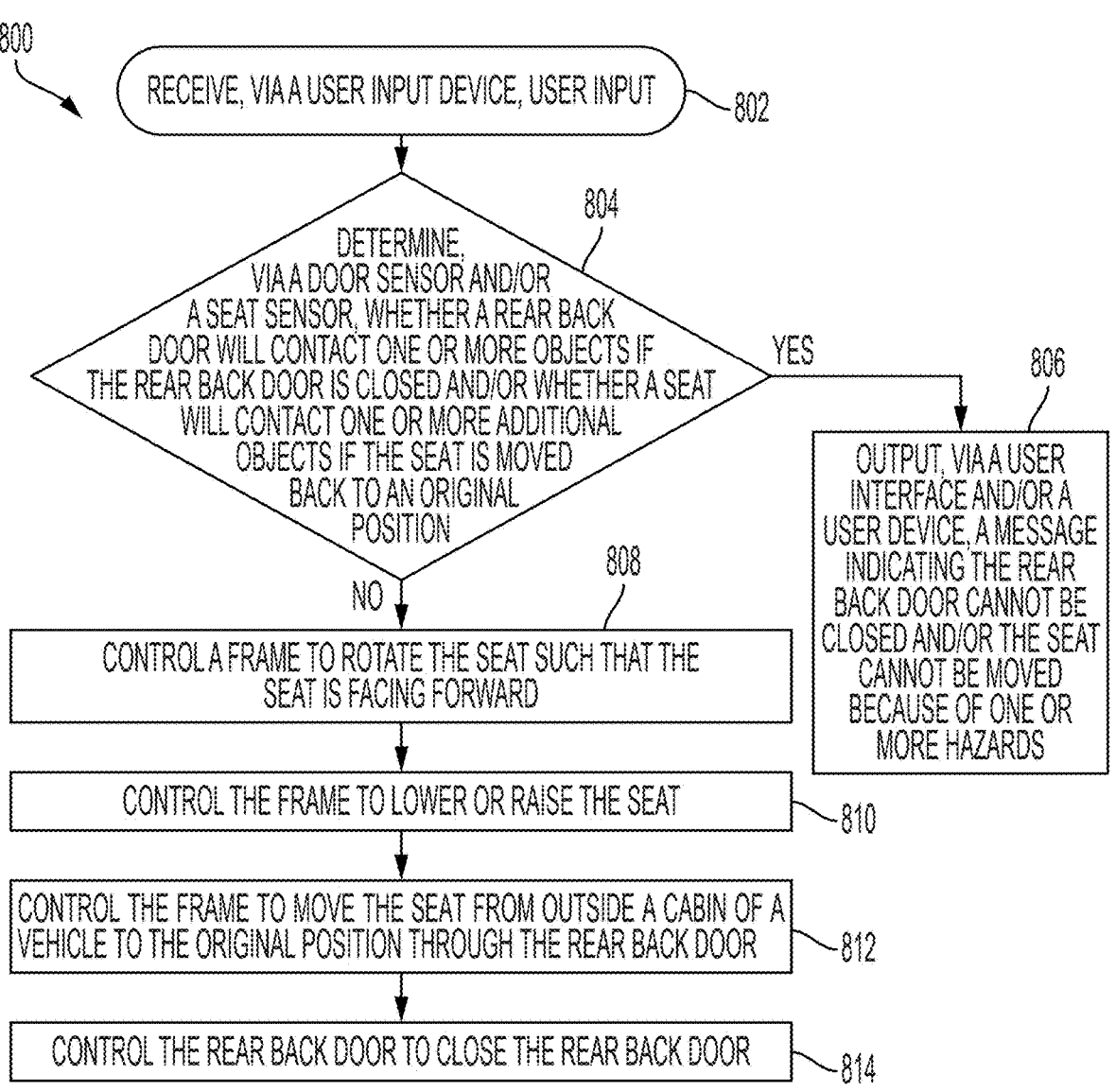
FIG. 8 is a flow diagram of an example process for controlling the automated ingress and egress system of FIG. 1 according to an aspect of the disclosure.

FIG. 8 is a flow diagram of an example process 800 for automated ingress to a vehicle. One or more computers or one or more data processing apparatuses, for example, the ECU 106 of the ingress and egress system 100 of FIG. 1, appropriately programmed, may implement the process 800. For ease of description, the process 800 is described below with reference to FIGS. 1, 2A, 2B, 3A, 3B, 3C, 3D, 4A, 4B, 5, 6A, and 6B. The process 800 of the present disclosure, however, is not limited to use of the exemplary ingress and egress systems of FIGS. 1, 2A, 2B, 3A, 3B, 3C, 3D, 4A, 4B, 5, 6A, and 6B.

The ingress and egress system 100 may detect and/or receive, via the user input device 112, user input (802). The user input device 112 may receive the user input and then provide and/or output the user input to the ECU 106. In examples, the ingress and egress system 100 may detect and/or receive, via the network access device 114, the user input from the user device 142. The user input may indicate that a passenger wishes to ingress to the vehicle 102 after sitting on the seat 120 and/or a driver of the vehicle 102 wishes to return the seat 120 (and/or the platform 322) to the original position 402 (and/or the original position 328) (e.g., after a passenger has vacated the seat 120).

In response to receiving the user input, the ingress and egress system 100 may determine, via the door sensor 116*a* and/or the seat sensor 116*b*, whether the rear door 136 will contact one or more objects if the rear door 136 is closed and/or whether the seat 120 (and/or the platform 322) will contact one or more additional objects if the seat 120 (and/or the platform 322) is moved back to the original position 402 (and/or the original position 328) (804). The ECU 106 may determine whether the rear door 136 will contact the one or more objects by receiving information (or spatial data) of the one or more objects in the first vicinity of the vehicle 102 and calculating whether the rear door 136 will contact the one or more objects based on the dimensions of the rear door 136 that are stored in the memory 108. The first vicinity being the swing path of the rear door 136 when opened and/or closed. The ECU 106 may determine whether the seat 120 (and/or the platform 322) will contact the one or more additional objects by receiving information (or spatial data) of the one or more additional objects in the second vicinity of the vehicle 102 and calculating whether the seat 120 (and/or the platform 322) will contact the one or more additional objects based on the dimensions of the seat 120 (and/or the platform 322) that are stored in the memory 108. The second vicinity being the movement path of the seat 120 (and/or the platform 322) when moved from outside the cabin 310 to the original position 402 (and/or the original position 328) through the rear door 136. If the answer is no, the ingress and egress system 100 may proceed to step 808.

If the answer in step 804 is yes, the ingress and egress system 100 may output, via the user interface 110 and/or the user device 142, a message indicating the rear door 136 cannot be closed and/or the seat 120 (and/or the platform 322) cannot be moved because of one or more hazards and/or obstructions in the swing path of the rear door 136 and/or the movement path of the seat 120 (and/or the platform 322) (806).

The ingress and egress system 100 may control the frame 138 to rotate the seat 120 (and/or the platform 322) such that the seat 120 (and/or the platform 322) is facing forward (i.e., the same direction as the original position 402 or 328) (808). The rotation device 138*b* of the frame 138 may rotate the seat 120 (and/or the platform 322) 90 degrees, 180 degrees, and/or 270 degrees to return the seat 120 (and/or the platform 322) to a forward facing position.

The ingress and egress system 100 may control the frame 138 to lower or raise the seat 120 (and/or the platform 322) (810). To lower or raise the seat 120 (and/or the platform 322), the lift 138*c* of the frame 138 may lower and/or raise the lower door half 212 of the rear door 136 to change the height of the seat 120 (and/or the platform 322) relative to the floor 202 of the vehicle 102. The lift 138*c* may lower and/or raise the lower door half 212 and/or the seat 120 (and/or the platform 322) such that the seat 120 (and/or the platform 322) is in a position to move and/or slide forward along the one or more rails 302.

The ingress and egress system 100 may control the frame 138 to move the seat 120 (and/or the platform 322) from outside of the cabin 310 to the original position 402 (and/or the original position 328) through the rear door 136 (812). The extend/retract device 138*a* of the frame 138 may move (or slide) the seat 120 (and/or the platform 322) forward along the one or more rails 302 and into the original position 402 (and/or the original position 328). In examples, the lift 138*c* may lift and/or move the seat 120 (and/or the platform 322) forward and inside of the cabin 310. In examples, the seat 120 may couple to the bench seat 506 after the lift 138*c* and/or the extend/retract device 138*a* moves the seat 120 forward and into the original position 402.

The ingress and egress system 100 may control the rear door 136 to open and close the rear door 136 (814). The ingress and egress system 100 may determine using the one or more sensors 116 whether any obstacles or objects are blocking the path of the rear door 136 prior to opening and closing the rear door 136.

Exemplary embodiments of the invention have been disclosed in an illustrative style. Accordingly, the terminology employed throughout should be read in a non-limiting manner. Although minor modifications to the teachings herein will occur to those well versed in the art, it shall be understood that what is intended to be circumscribed within the scope of the patent warranted hereon are all such embodiments that reasonably fall within the scope of the advancement to the art hereby contributed, and that that scope shall not be restricted, except in light of the appended claims and their equivalents.

What is claimed is:

1. An automated ingress and egress system for passengers of a vehicle, comprising:

a rear back door of the vehicle configured to open and close;

a seat having an original position defined by the seat facing forward relative to the vehicle and being located within a cabin of the vehicle;

a frame coupled to the seat and a floor of the vehicle and configured to move the seat from the original position to outside the cabin through the rear back door and horizontally rotate the seat between 0-360 degrees relative to the original position; and an electronic control unit (ECU) electrically connected to the rear back door and the frame and configured to:

control the rear back door to open the rear back door;

control the frame to move the seat from the original position to outside the cabin through the rear back door to allow an occupant of the seat to egress from the vehicle through the rear back door;

control the frame to rotate the seat between 0-360 degrees relative to the original position after the seat is moved from the original position to outside the cabin through the rear back door;

control the frame to move the seat from outside the cabin to the original position through the rear back door to allow another occupant of the seat to ingress to the vehicle through the rear back door; and control the rear back door to close the rear back door.

2. The automated ingress and egress system of claim 1, wherein:

the rear back door includes an upper door half and a lower door half, the lower door half being configured to split from the upper door half and to swing downward when the rear back door opens;

the frame includes one or more rails coupled to the floor and the lower door half;

the seat is movably coupled to the one or more rails; and to control the frame to move the seat from the original position to outside the cabin through the rear back door, the ECU is further configured to:

control the frame to move the seat along the one or more rails from the original position to atop the lower door half such that the seat is outside the cabin.

3. The automated ingress and egress system of claim 2, wherein:

the frame further includes a lift coupled to the floor and the lower door half and configured to lower and raise the lower door half; and the ECU is further configured to:

control the frame to lower or raise the lower door half when the seat is atop the lower door half to lower or raise a height of the seat relative to the floor.

4. The automated ingress and egress system of claim 3, further comprising:

a distance sensor configured to measure a distance between the lower door half and a street below the lower door half, wherein to control the frame to lower or raise the lower door half, the ECU is further configured to:

lower the lower door half based on the distance between the lower door half and the street below the lower door half.

5. The automated ingress and egress system of claim 1, wherein:

the frame further includes an arm coupled to the floor and the seat and configured to move the seat; and to control the frame to move the seat from the original position to outside the cabin through the rear back door, the ECU is further configured to:

control the arm of the frame to move the seat from the original position to outside the cabin through the rear back door.

6. The automated ingress and egress system of claim 1, wherein:

the frame is further configured to horizontally rotate the seat 90 degrees, 180 degrees, and/or 270 degrees relative to the original position; and the ECU is further configured to:

control the frame to rotate the seat 90 degrees, 180 degrees, or 270 degrees relative to the original position after the seat is moved from the original position to outside the cabin through the rear back door.

7. The automated ingress and egress system of claim 6, further comprising:

a sensor including a camera and/or a distance sensor and configured to indicate a sidewalk orientation corresponding to whether a sidewalk is alongside the vehicle or behind the vehicle, wherein:

the ECU is electrically connected to the sensor; and controlling the frame to rotate the seat 90 degrees, 180 degrees, or 270 degrees relative to the original position is based on the sidewalk orientation.

8. The automated ingress and egress system of claim 1, further comprising:

a door sensor configured to detect one or more objects within a swing path of the rear back door; and a user interface having a display, wherein the ECU is electrically connected to the door sensor and the user interface and further configured to:

determine, via the door sensor, whether the one or more objects are within the swing path of the rear back door, stop or prevent the rear back door from opening when the one or more objects are in the swing path of the rear back door to prevent the rear back door from contacting the one or more objects, and output, via the user interface, a warning message indicating the rear back door cannot be opened.

9. The automated ingress and egress system of claim 1, further comprising:

a seat sensor configured to detect one or more objects within a movement path of the seat, wherein the ECU is electrically connected to the seat sensor and further configured to:

determine, via the seat sensor, whether the one or more objects are in the movement path of the seat; and stop or prevent the seat from moving when the one or more objects are in the movement path of the seat to prevent the seat from contacting the one or more objects.

10. The automated ingress and egress system of claim 1, further comprising:

a seat belt sensor configured to determine whether an occupant of the seat is secured by a seat belt of the seat, wherein the ECU is further configured to:

determine, via the seat belt sensor, whether the occupant of the seat is secured by the seat belt of the seat; and stop or prevent the seat from moving when the occupant of the seat is not secured by the seat belt of the seat.

11. An automated ingress and egress system for passengers of a vehicle, comprising:

a rear back door of the vehicle configured to open and close;

a third row of seats of the vehicle;

a frame coupled to at least one seat of the third row of seats and a floor of the vehicle and configured to move the at least one seat from inside a cabin of the vehicle to outside the cabin through the rear back door and horizontally rotate the at least one seat between 0-360 degrees relative to the third row of seats; and an electronic control unit (ECU) electrically connected to the rear back door and the frame and configured to:

control the rear back door to open the rear back door;

control the frame to separate the at least one seat from the third row of seats and move the at least one seat from inside the cabin to outside the cabin through the rear back door to allow an occupant of the at least one seat to egress from the vehicle through the rear back door;

control the frame to rotate the at least one seat between 0-360 degrees relative to the third row of seats after the seat is separated from the third row of seats and moved to outside the cabin through the rear back door;

control the frame to move the at least one seat from outside the cabin to inside the cabin through the rear back door to allow another occupant of the at least one seat to ingress to the vehicle through the rear back door; and control the rear back door to close the rear back door.

12. The automated ingress and egress system of claim 11, wherein:

the rear back door includes an upper door half and a lower door half, the lower door half being configured to split from the upper door half and to swing downward when the rear back door opens;

the frame includes one or more rails coupled to the floor and the lower door half;

the at least one seat is movably coupled to the one or more rails; and to control the frame to move the at least one seat from inside the cabin to outside the cabin through the rear back door, the ECU is further configured to:

control the frame to move the at least one seat along the one or more rails from inside the cabin to atop the lower door half such that the at least one seat is outside the cabin.

13. The automated ingress and egress system of claim 12, wherein:

the frame further includes a lift coupled to the floor and the lower door half and configured to lower and raise the lower door half; and the ECU is further configured to:

control the frame to lower or raise the lower door half when the at least one seat is atop the lower door half to lower or raise a height of the at least one seat relative to the floor.

14. The automated ingress and egress system of claim 13, further comprising:

a distance sensor electrically connected to the ECU and configured to measure a distance between the lower door half and a street below the lower door half, wherein to control the frame to lower or raise the lower door half, the ECU is further configured to:

lower the lower door half based on the distance between the lower door half and the street below the lower door half.

15. The automated ingress and egress system of claim 11, further comprising:

a seat belt sensor configured to determine whether an occupant of the at least one seat is secured by a seat belt of the at least one seat, wherein the ECU is electrically connected to the seat belt sensor and is further configured to:

determine, via the seat belt sensor, whether the occupant of the at least one seat is secured by the seat belt of the at least one seat; and stop or prevent the at least one seat from moving when the occupant of the at least one seat is not secured by the seat belt of the at least one seat.

16. The automated ingress and egress system of claim 11, further comprising:

a door sensor configured to detect one or more objects within a swing path of the rear back door, wherein the ECU is electrically connected to the door sensor and further configured to:

determine, via the door sensor, whether the one or more objects are within the swing path of the rear back door; and stop or prevent the rear back door from opening when the one or more objects are within the swing path of the rear back door to prevent the rear back door from contacting the one or more objects.

17. An automated ingress and egress system for a vehicle, comprising:

a rear back door of the vehicle configured to open and close;

a platform configured to hold and/or secure a wheelchair and/or one or more objects and having an original position defined by the platform facing forward relative to the vehicle and being located within a cabin of the vehicle;

a frame coupled to the platform and a floor of the vehicle and configured to move the platform from the original position to outside the cabin through the rear back door and horizontally rotate the platform between 0-360 degrees relative to the original position; and an electronic control unit (ECU) electrically connected to the rear back door and the frame and configured to:

control the rear back door to open the rear back door;

control the frame to move the platform from the original position to outside the cabin through the rear back door;

control the frame to rotate the platform between 0-360 degrees relative to the original position after the platform is moved from the original position to outside the cabin through the rear back door;

control the frame to move the platform from outside the cabin to the original position through the rear back door; and control the rear back door to close the rear back door.

18. The automated ingress and egress system of claim 17, wherein:

the rear back door includes an upper door half and a lower door half, the lower door half being configured to split from the upper door half and to swing downward when the rear back door opens;

the frame includes one or more rails coupled to the floor and the lower door half;

the platform is movably coupled to the one or more rails; and to control the frame to move the platform from the original position to outside the cabin through the rear back door, the ECU is further configured to:

control the frame to move the platform along the one or more rails from the original position to atop the lower door half such that the platform is outside the cabin.

19. The automated ingress and egress system of claim 18, wherein:

the frame further includes a lift coupled to the floor and the lower door half and configured to lower and raise the lower door half; and the ECU is further configured to:

control the frame to lower or raise the lower door half when the platform is atop the lower door half to lower or raise a height of the platform relative to the floor.

20. The automated ingress and egress system of claim 17, wherein:

the frame further includes an arm coupled to the floor and the platform and configured to move the platform; and to control the frame to move the platform from the original position to outside the cabin through the rear back door, the ECU is further configured to:

control the arm of the frame to move the platform from the original position to outside the cabin through the rear back door.

* * * * *